US007606251B2

(12) United States Patent
Fernandes et al.

(10) Patent No.: US 7,606,251 B2
(45) Date of Patent: Oct. 20, 2009

(54) METHOD, SYSTEM, AND COMPUTER PROGRAM PRODUCT FOR REDUCING NETWORK COPIES BY PORT-BASED ROUTING TO APPLICATION-SPECIFIC BUFFERS

(75) Inventors: Lilian Sylvia Fernandes, Austin, TX (US); Vinit Jain, Austin, TX (US); Jeffrey Paul Messing, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/912,497

(22) Filed: Aug. 5, 2004

(65) Prior Publication Data

US 2006/0029059 A1 Feb. 9, 2006

(51) Int. Cl.
*H04L 12/28* (2006.01)
*H04L 12/56* (2006.01)
*G06F 13/12* (2006.01)
*G06F 13/38* (2006.01)

(52) U.S. Cl. ......................................... 370/419; 710/52
(58) Field of Classification Search .................. 370/412, 370/415, 417, 229–240, 419–420; 710/52; 709/201, 213
See application file for complete search history.

(56) References Cited

U.S. PATENT DOCUMENTS

| 6,907,042 | B1 | 6/2005 | Oguchi | |
|---|---|---|---|---|
| 2004/0103225 | A1* | 5/2004 | McAlpine et al. | 710/52 |
| 2004/0190516 | A1* | 9/2004 | Williams | 370/392 |
| 2004/0230695 | A1* | 11/2004 | Anschutz et al. | 709/232 |
| 2005/0129040 | A1* | 6/2005 | Kiel et al. | 370/412 |
| 2005/0190779 | A1* | 9/2005 | Hoffman et al. | 370/412 |

* cited by examiner

*Primary Examiner*—Kevin C Harper
(74) *Attorney, Agent, or Firm*—Dillon & Yudell LLP

(57) ABSTRACT

A method, system, and computer program product for delivering data, received from a network on a network adapter to a pre-assigned port, to a storage buffer assigned to an application are disclosed. An application designates an application-specific buffer within a local data processing system for buffering data communicated with the application. The local data processing system reports to a network interface of the local data processing system a memory address of the designated application-specific buffer, and the data processing system designates a port on which to receive packets addressed to the memory address. The data processing system then sends a port registration message to the local network interface, enabling the network interface to compare the port number of incoming traffic to a registered port number and route incoming traffic from a remote data processing system directly to the designated application-specific buffers in the event of a match. In one embodiment, the present invention includes receiving in the network interface a packet addressed to the specific port and delivering data from the packet to said application-specific buffer.

21 Claims, 3 Drawing Sheets

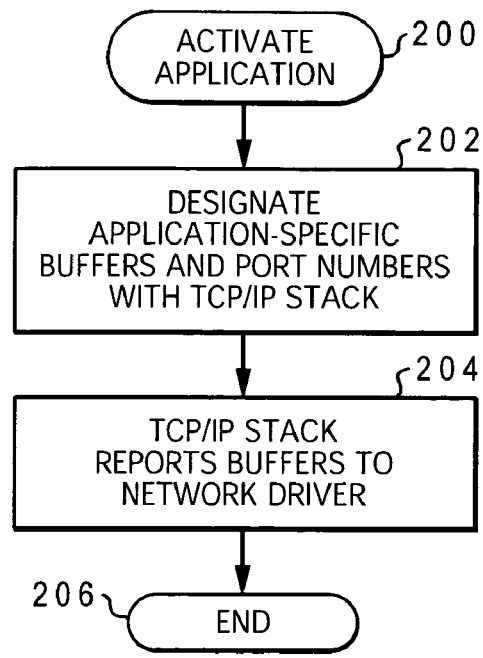
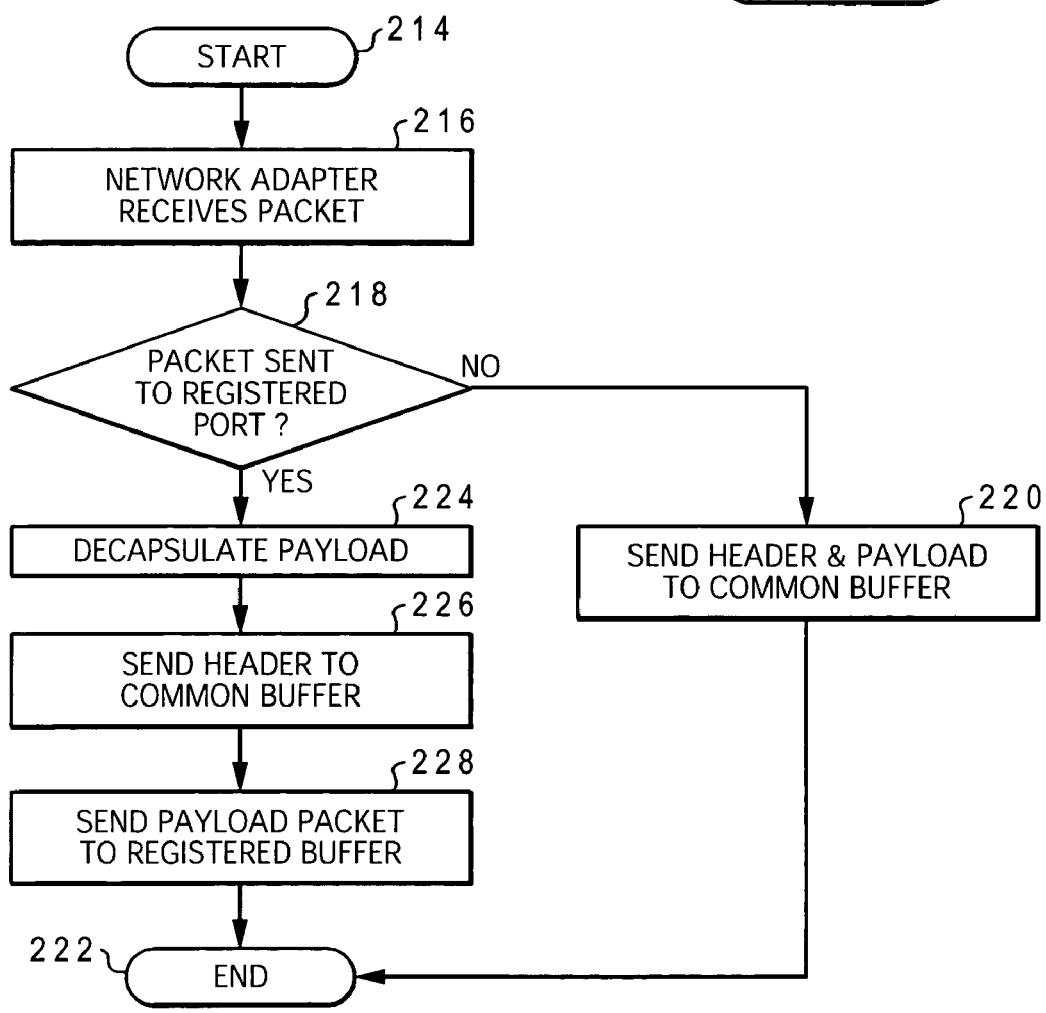
Fig. 2A
Fig. 2B

METHOD, SYSTEM, AND COMPUTER PROGRAM PRODUCT FOR REDUCING NETWORK COPIES BY PORT-BASED ROUTING TO APPLICATION-SPECIFIC BUFFERS

CROSS-REFERENCE TO RELATED APPLICATION

The present application is related to the following co-pending U.S. patent application filed Aug. 5, 2004, and incorporated herein by reference in its entirety:

Ser. No. 10/912,498, entitled "METHOD, SYSTEM, AND COMPUTER PROGRAM PRODUCT FOR DELIVERING DATA TO A STORAGE BUFFER ASSIGNED TO AN APPLICATION".

BACKGROUND OF THE INVENTION

1. Technical Field

The present invention relates in general to data processing and in particular to improving efficiency of data receipt and distribution within a data processing system connected to a network. Still more particularly, the present invention relates to a system, method and computer program product for delivering data received on a network adapter for a pre-assigned port number directly to a storage buffer assigned to an application.

2. Description of the Related Art

The profusion of applications exchanging data across networks now enables a range of technologies inconceivable only a few years ago. Applications exchanging data over a network range from email clients and servers to World Wide Web browsers communicating with servers to Voice-over-Internet-Protocol (VoIP) applications.

Some applications are able to tolerate high levels of latency and delay in data receipt. Examples include electronic mail and file transfer protocol clients. These clients were not designed to require the perception of 'real time' interaction with the network, and users will tolerate a substantial aggregate delay between the time at which information is requested and the time at which it is received. Users are, however, generally less tolerant of the loss of information between the sending and receiving points.

When the Internet protocols were first designed to support network applications, this lack of sensitivity to delay was exploited to create a highly redundant protocol called the Transport Control Protocol (TCP). In the use of TCP on a local data processing system, data for applications is routed from common buffers to application-specific buffers. The result, while providing a highly-reliable systemic backbone for networked applications, also builds delay into the receipt of data as data is internally copied within a data processing system from common buffers to application-specific buffers.

An example of this problem is illustrated in FIG. 3, which depicts a data processing system in a network environment, delivering data received from a network directly to common buffers and then copying that data to an application-specific buffer according to conventional methods. The illustrated network environment includes a local or wide area network 400, such as the Internet or another packetized digital network. A local data processing system 402, a remote data processing system 404 (e.g., an FTP server, an HTTP server, a simple mail transfer protocol (SMTP) and Post Office Protocol 3 (POP3) or Internet Message Access Protocol (IMAP) server, or a file server) are attached to network 400.

Remote data processing system 404 performs functions related to the sending and receiving of electronic data, including receiving requests for files and sending files across network 400.

Local data processing system 402 includes a processing resource 406 for performing data processing functions and a storage unit 408 for storing items of data or instructions for use by processing resource 406. Local data processing system 402 also includes a network interface 410 for communicating with other devices attached to network 400 and an input device 412. As illustrated, storage unit 408 stores applications 413, operating system (OS) 414, network driver 416, Transmission Control Protocol/Internet Protocol (TCP/IP) stack 418, common buffers 420, and application-specific buffers 424, 425, and 426.

In the prior art, application 413 sends a data request 428 to TCP/IP stack 418, and TCP/IP stack 418 routes data request 428 to network driver 416. Network driver 416 then passes data request 428 to operating system 414, which, through the operation of processing resource 406, sends data request 428 to remote data system 404 over network 400 via network interface 410.

Under the prior art technique, remote data processing system 404, upon receiving data request 428, responds to data request 428 with data delivery 430, which remote data processing system 404 sends over network 400 to network interface 410 of local data processing system 402.

Processing resource 406 routes data delivery 430 from network interface 410 to operating system 414 in storage unit 408. Once data delivery 430 has arrived within storage unit 408, operating system 414 routes data delivery 430 from network driver 416 to TCP/IP stack 418. Data delivery 430 is then routed to common buffers 420. Once data delivery 430 reaches common buffers 420, a copy 432 of data delivery 430 is routed to application-specific buffer 426, where processing resource 406 can employ copy 432 in conjunction with the instructions of applications 413. The prior art technique results in a high-latency environment, wherein time and resources are wasted. Increasingly, applications such as VoIP or streaming video require the lowest possible delivery latency for information. What is needed is a way to eliminate delay within a local data processing system.

SUMMARY OF THE INVENTION

A method, system, and computer program product for delivering data, received from a network on a network adapter to a pre-assigned port, to a storage buffer assigned to an application are disclosed. An application designates an application-specific buffer within a local data processing system for buffering data communicated with the application. The local data processing system reports to a network interface of the local data processing system a memory address of the designated application-specific buffer, and the data processing system designates a port on which to receive packets addressed to the memory address. The data processing system then sends a port registration message to the local network interface, enabling the network interface to compare the port number of incoming traffic to a registered port number and route incoming traffic from a remote data processing system directly to the designated application-specific buffers in the event of a match.

In one embodiment, the present invention includes receiving in the network interface a packet addressed to the specific port and delivering data from the packet to said application-specific buffer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A is a high-level logical flowchart of a process for designating, registering, and reporting a buffer, specifying a port for receiving data, and creating and sending a message to enable delivery of data, received from a network on a pre-assigned port, to a storage buffer assigned to an application in accordance with a preferred embodiment of the present invention;

FIG. 2B is a high-level logical flowchart of a process for delivering data, received from a network or a pre-assigned port, to a storage buffer assigned to an application in accordance with a preferred embodiment of the present invention.

DETAILED DESCRIPTION OF THE ILLUSTRATIVE EMBODIMENT

Figure 1:
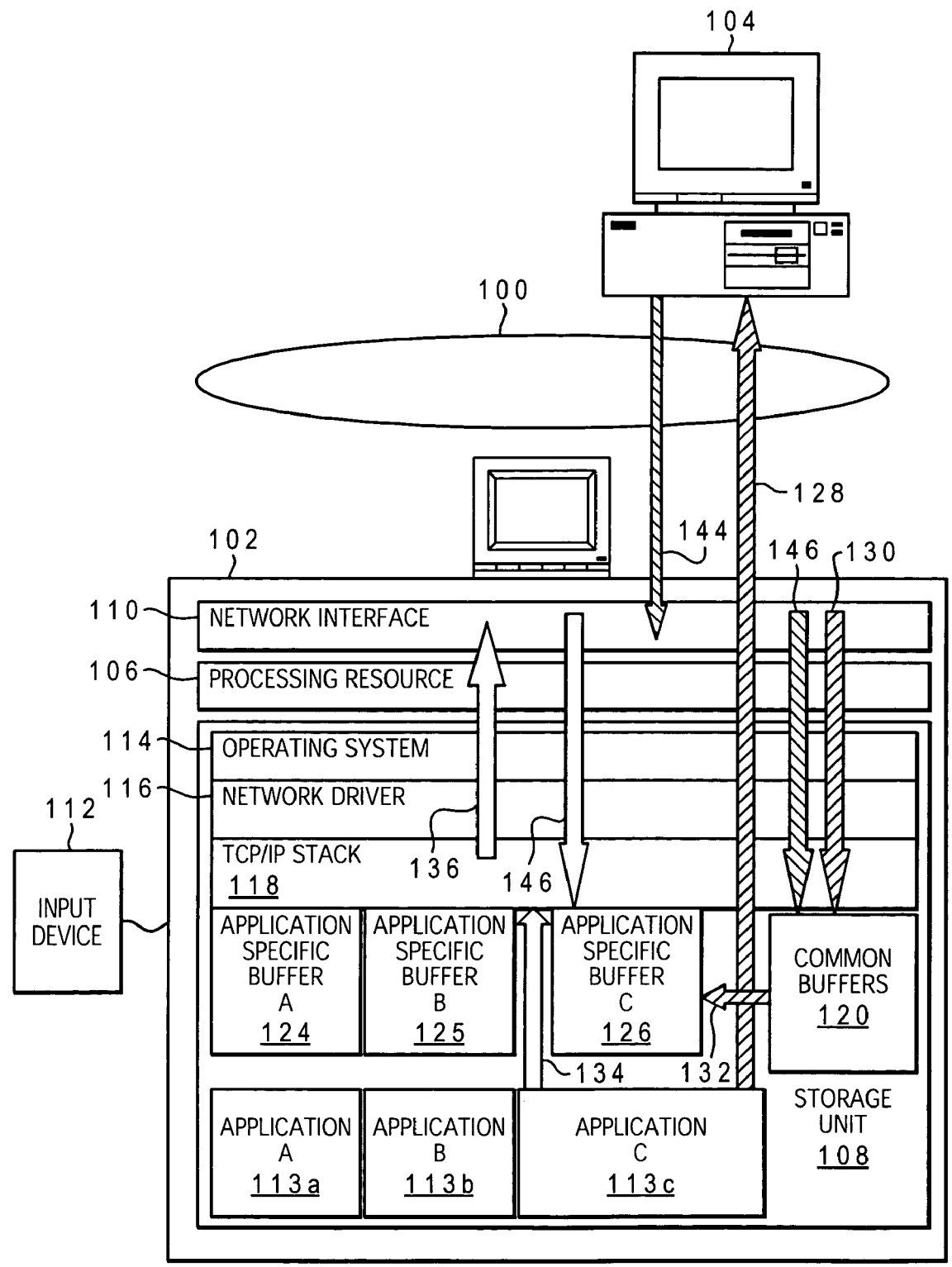
FIG. 1 illustrates a data processing system in a network environment, in which preferred embodiments of the method, system and computer program product for reducing network copies are implemented.
Figure 3:
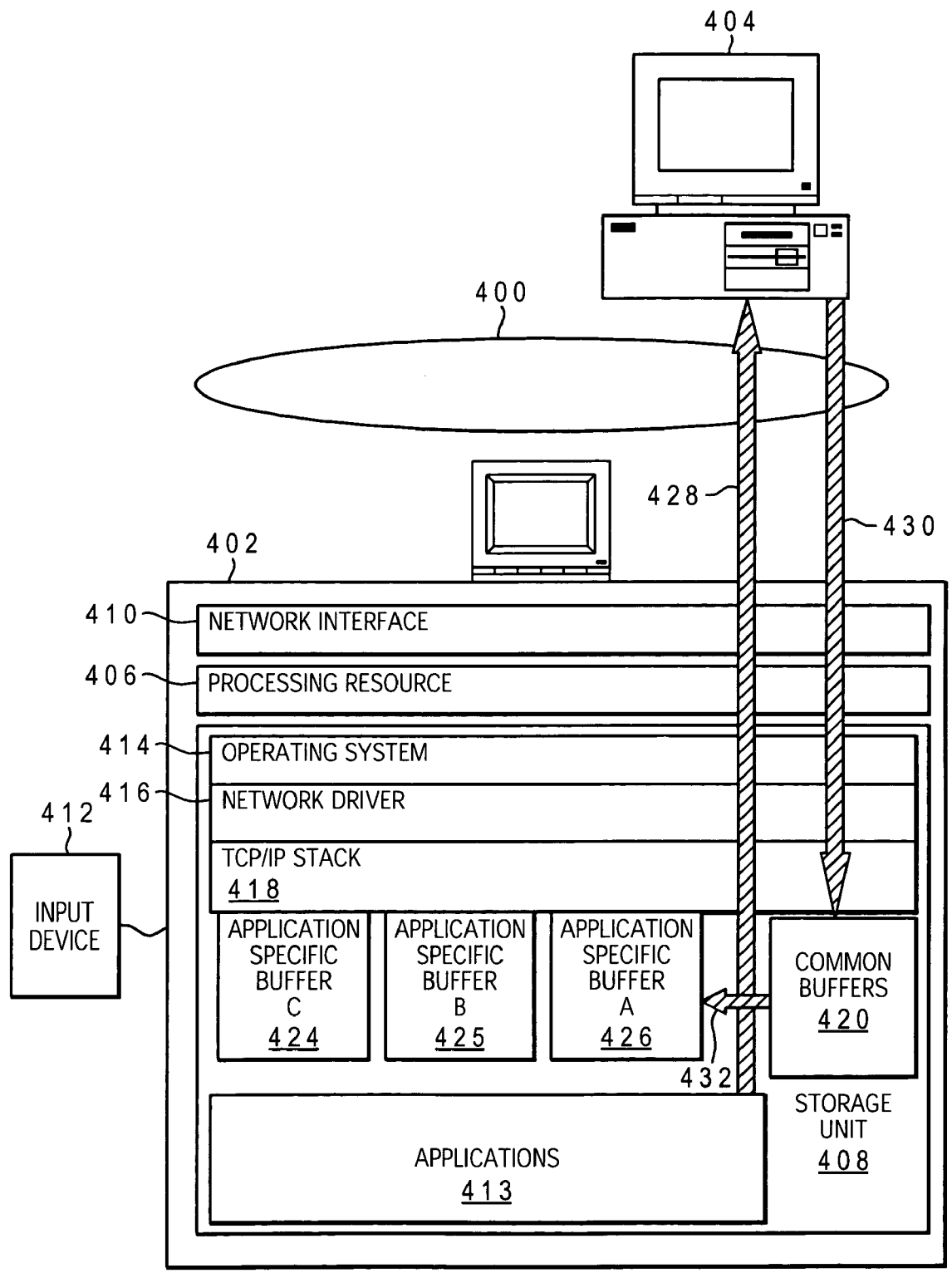
FIG. 3 illustrates a data processing system in a network environment delivering data received from a network on a particular port directly to a common buffer and copying to an application-specific buffer according to the method of the prior art.

With reference now to the figures and in particular with reference to FIG. 1, there is depicted an exemplary network environment with which the present invention may be advantageously utilized. The illustrated network environment includes a local or wide area network 100, such as the Internet or another packetized digital network. A local data processing system 102 and a remote data processing system 104 (e.g., an FTP server, an HTTP server, a simple mail transfer protocol (SMTP) and Post Office Protocol 3 (POP3) or Internet Message Access Protocol (IMAP) server, or a file server) are attached to network 100.

Remote data processing system 104 performs functions related to the sending and receiving of electronic data, including receiving requests for files and sending files across network 100. Remote data processing system 104 and local data processing system 102 may both be implemented with conventional or later-developed hardware or software.

Local data processing system 102 includes a processing resource 106 for performing data processing functions and a storage unit 108 for storing items of data or instructions for use by processing resource 106. Local data processing system 102 also includes a network interface 110, also called a network adapter (e.g. an Ethernet adapter), for communicating with other devices attached to network 100 and an input device 112, such as a keyboard or mouse.

Turning in detail to storage unit 108, storage unit 108 may be implemented as a Random Access Memory (RAM) or as another form of storage, such as a direct access storage device. As illustrated, storage unit 108 stores application A 113a, application B 113b and application C 113c (any of which can be kernel applications or user space applications), operating system (OS) 114, network driver 116 and Transmission Control Protocol/Internet Protocol (TCP/IP) stack 118.

As illustrated, storage unit 108 also contains common buffers 120 (also called kernel buffers), and application-specific buffers 124 (corresponding to and servicing application A 113a), 125 (corresponding to and servicing application B 113b), and 126 (corresponding to and servicing application C 113c). In the preferred embodiment depicted in FIG. 1, each application-specific buffer corresponds to and services an individual application, though one skilled in the art will quickly ascertain that some applications may advantageously share data, in which case an application-specific buffer may correspond to and service more than one application, and that multiple applications may then access the data contained within one application-specific buffer.

The present invention improves efficiency of data receipt in a data processing system, such as local data processing system 102, by immediately directing a portion of data received through network 100 from remote data processing system 104 to application-specific buffers 124, 125, and 126, on the basis of the level 4 (e.g. Transmission Control Protocol or User Datagram Protocol) ports to which that data is addressed, rather than allowing all of data received through network 100 from remote data processing system 104 to be routed to common buffer 120 before being copied to application-specific buffers 124, 125, and 126. The preferred embodiment enables delivery to application-specific buffers 124, 125, and 126, on the basis of the level 4 ports to which that data is addressed with minimal changes to the firmware of a network adapter 110, such as an Ethernet adapter. Directing a portion of data received through network 100 from remote data processing system 104 to application-specific buffers 124, 125, and 126, on the basis of the ports to which that data is addressed, is preferably accomplished through the use of several messages, which are sent and received by local data processing system 102 and detailed with respect to the subsequent flowchart diagrams, and with respect to FIG. 1.

With reference now to FIG. 2A, there is depicted a high-level logical flowchart of a process for designating, registering, and reporting a buffer and port number, to enable the delivery of data, received from a network, to a storage buffer assigned to an application in accordance with a preferred embodiment of the present invention. The process begins at step 200, which depicts activation of an application 113c on local data processing system 102. The process then proceeds to step 202, which illustrates application 113c designating application-specific buffer 126 as its associated buffer. As depicted in FIG. 1, in one embodiment application 113c designates a communication buffer, such as application-specific buffer 126, for storage of its data by sending a designation message 134 from application 113c to TCP/IP stack 118, which and designates an associated port number.

The process next moves to step 204, which depicts TCP/IP stack 118 reporting designation of application-specific buffer 126 to network interface 110. Reporting designation of application-specific buffer 126 to network interface 110 is accomplished when TCP/IP 118 stack sends reporting message 136, containing a memory address of a communication buffer and a port number to network interface 110, as shown in FIG. 1. The memory address from reporting message 136 is recorded by network interface 110. The process thereafter terminates at block 206.

With reference now to FIG. 2B, a high-level logical flowchart of a process for delivering data, received from a network, to a storage buffer assigned to an application in accordance with a preferred embodiment of the present invention is illustrated. The process begins at step 214, typically with the invocation of a receive routine within network driver 116 of local data processing system 102. The process then proceeds to step 216, which illustrates network interface 110 receiving response 144, which contains data requested by data request 128 in FIG. 1.

The creation of response 144 results from a process that allows the method of the preferred embodiment to be invisible to and practiced in cooperation with a remote data processing system 104 containing legacy hardware. As in the prior art, an application 113c sends a data request 128 to TCP/IP stack 118, and TCP/IP stack 118 routes data request 128 to network driver 116. Network driver 116 then passes data request 128 to operating system 114, which, through the operation of processing resource 106, sends data request 128 to remote data system 104 over network 100 via network interface 110. Network interface 110 assigns and inserts within data request 128 a specific port for the sending of data request 128 and receipt of subsequent response 144.

Under the prior art technique, remote data processing system 104, upon receiving data request 128, responds to data request 128 with response 144, which remote data processing system 104 sends over network 100 to network interface 110 of local data processing system 102 on the port specified in data request 128.

The process next moves to step 218, which depicts network interface 110 determining whether response 144 is sent to registered port, associated with an application 113c on local data processing system 102.

If network driver 116 determines that response 144 was not sent to a registered port, associated with an application 113c on local data processing system 102, then the process proceeds to step 220, which illustrates network driver 116 sending content from response 144 to common buffer 120. In this case, content from response 144 is handled in the conventional manner described above with respect to data delivery 430.

That is, processing resource 106 routes delivered data 130 from network interface 110 to operating system 114 in storage unit 108. Once delivered data 130 has arrived within storage unit 108, operating system 114 routes both payload data and header data within delivered data 130 from network driver 116 to TCP/IP stack 118. Both payload data and header data from delivered data 130 are then routed to common buffers 120. Once payload data and header data from delivered data 130 reach common buffers 120, a copy 132 of payload data from delivered data 130 is routed to application-specific buffer 126, where processing resource 106 can employ copy 132 in conjunction with the instructions of application 112. Following this conventional handling, the process shown in FIG. 2B terminates at step 222.

Returning to block 218 above, if network interface 110 determines that response 144 was sent to a registered port, then the process proceeds to step 224. Step 224 illustrates network interface 110 decapsulating payload from response 144. The process then proceeds to step 226, which depicts network interface 110 sending header information 146 from response 144 to common buffer 120 to facilitate the maintenance of TCP/IP stack 118.

As is shown at step 228, the payload 145, in contrast, is transmitted by network interface 110 directly to application-specific buffer 126. Processing resource 106 can then employ payload 145, which the present invention has allowed to bypass common buffers 120, in conjunction with the instructions of application 112. The process then moves to step 222, which depicts the end of the process.

The bypass discussed above with respect to step 228 provides tremendous utility by eliminating the copying of data first to common buffer 120 and then to application-specific buffer C 126. Under the method of the prior art, data, requested by application 113c must first be copied to common buffer 120 and then to application-specific buffer C 126. The copying employed by the method of the prior art delays the arrival of data at application-specific buffer C 126, thereby delaying the operation of all processes that depend on the arrival of data in application-specific buffer C 126. By eliminating the copying step of the prior art, the latency incurred waiting for data to arrive in application-specific buffer C 126 is reduced, and overall system performance is improved.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs.

What is claimed is:

1. A method for communicating data between a remote data processing system and a local data processing system within a network, said method comprising:

designating an application-specific buffer within a local data processing system for buffering data to be communicated to an application executing on said local data processing system by sending a designation message from said application to a TCP/IP stack;

registering with a network interface of said local data processing system a registered port for packets communicated with said application;

in response to the receipt of a packet at said network interface, determining if said packet specifies said registered port associated with said application executing on said local data processing system;

in response to a determination that said packet does not specify said registered port associated with said application executing on said local data processing system, delivering data by said network interface from said packet to a common buffer; and in response to a determination that said packet specifies said registered port associated with said application executing on said local data processing system, delivering data by said network interface from said packet to said application-specific buffer of said application according to said port registration.

2. The method of claim 1, wherein said method further includes delivering header information by said network interface from said packet to a common buffer in said local data processing system.

3. The method of claim 2, wherein:

said designating an application-specific buffer within said local data processing system further includes designating a common buffer; and said delivering data from said packet to said application-specific buffer further includes delivering data from said packet to said application-specific buffer while bypassing said common buffer.

4. The method of claim 1, wherein said designating an application-specific buffer further includes pre-registering said address of said application-specific buffer with a TCP/IP stack by said application.

5. The method of claim 1, wherein said method further includes:

registering said address of said application-specific buffer with a communication driver by said TCP/IP stack; and recording said address of said application-specific buffer by said communication driver.

6. The method of claim 1, wherein said registering further includes registering with an Ethernet adapter a port for packets communicated with said application.

7. The method of claim 1, wherein said determining further includes determining a Transmission Control Protocol Packet if said Transmission Control Protocol Packet specifies a registered port.

8. An apparatus for communicating data between a remote data processing system and a local data processing system within a network, said apparatus comprising:
   means for designating an application-specific buffer within a local data processing system for buffering data to be communicated to an application executing on said local data processing system by sending a designation message from said application to a TCP/IP stack;
   means for registering with a network interface of said local data processing system a registered port for packets communicated with said application;
   means for, in response to the receipt of a packet at said network interface, determining if said packet specifies said registered port associated with said application executing on said local data processing system;
   means for, in response to a determination that said packet does not specify a registered port associated with said application executing on said local data processing system, delivering data by said network interface from said packet to a common buffer; and
   means for, responsive to a determination that said packet specifies said registered port associated with said application executing on said local data processing system, delivering data by said network interface from said packet to said application-specific buffer of said application according to said port registration.

9. The apparatus of claim 8, wherein said apparatus further includes means for delivering header information by said network interface from said packet to a common buffer in said local data processing system.

10. The apparatus of claim 8, wherein:
    said means for designating an application-specific buffer within said local data processing system further includes means for designating a common buffer; and
    said means for delivering data from said packet to said application-specific buffer further includes means for delivering data from said packet to said application-specific buffer while bypassing said common buffer.

11. The apparatus of claim 8, wherein said means for designating an application-specific buffer further includes means for pre-registering said address of said application-specific buffer with a TCP/IP stack by said application.

12. The apparatus of claim 8, wherein said apparatus further includes:
    means for registering said address of said application-specific buffer with a communication driver by said TCP/IP stack; and
    means for recording said address of said application-specific buffer by said communication driver.

13. The apparatus of claim 8, wherein said means for registering further includes means for registering with an Ethernet adapter a port for packets communicated with said application.

14. The apparatus of claim 8, wherein said means for determining further includes means for determining a Transmission Control Protocol Packet if said Transmission Control Protocol Packet specifies a registered port.

15. A computer-readable medium having a computer program product for communicating data between a remote data processing system and a local data processing system within a network, said computer-readable medium comprising:
    instructions for designating an application-specific buffer within a local data processing system for buffering data to be communicated to an application executing on said local data processing system by sending a designation message from said application to a TCP/IP stack;
    instructions for registering with a network interface of said local data processing system a registered port for packets communicated with said application;
    instructions for, in response to the receipt of a packet at said network interface, determining if said packet specifies said registered port associated with said application executing on said local data processing system;
    instructions for, in response to a determination that said packet does not specify a registered port associated with said application executing on said local data processing system, delivering data by said network interface from said packet to a common buffer; and
    instructions, in response to a determination that said packet specifies said registered port associated with said application executing on said local data processing system, delivering data by said network interface from said packet to said application-specific buffer of said application according to said port registration.

16. The computer-readable medium of claim 15, wherein said computer-readable medium further includes instructions for delivering header information by said network interface from said packet to a common buffer in said local data processing system.

17. The computer-readable medium of claim 16, wherein:
    said instructions for designating an application-specific buffer within said local data processing system further include instructions for designating a common buffer; and
    said instructions for delivering data from said packet to said application-specific buffer further include instructions for delivering data from said packet to said application-specific buffer while bypassing said common buffer.

18. The computer-readable medium of claim 15, wherein said instructions for designating an application-specific buffer further include instructions for pre-registering said address of said application-specific buffer with a TCP/IP stack by said application.

19. The computer-readable medium of claim 15, wherein said instructions for registering further include instructions for registering with an Ethernet adapter a port for packets communicated with said application.

20. The computer-readable medium of claim 15, wherein said instructions for determining a Transmission Control Protocol Packet further includes instructions for determining if said Transmission Control Protocol Packet specifies a registered port.

21. The computer-readable medium of claim 15, wherein said computer-readable medium further includes:
    instructions for registering said address of said application-specific buffer with a communication driver by said TCP/IP stack; and
    instructions for, recording said address of said application-specific buffer by said communication driver.

* * * * *

UNITED STATES PATENT AND TRADEMARK OFFICE
CERTIFICATE OF CORRECTION

PATENT NO. : 7,606,251 B2  Page 1 of 1
APPLICATION NO. : 10/912497
DATED : October 20, 2009
INVENTOR(S) : Fernandes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Fifth Day of October, 2010

David J. Kappos
*Director of the United States Patent and Trademark Office*